United States Patent [19]
Sturgeon et al.

[11] Patent Number: 6,064,385
[45] Date of Patent: May 16, 2000

[54] SYSTEMS WITH USER PREFERENCE SETTING SCHEMES

[75] Inventors: Derrill L. Sturgeon; Christopher A. Howard, both of Houston, Tex.

[73] Assignee: Compaq Computer Corporation, Houston, Tex.

[21] Appl. No.: 08/941,775

[22] Filed: Sep. 30, 1997

[51] Int. Cl.[7] ....................................................... G11B 7/00
[52] U.S. Cl. ............................................ 345/353; 345/356
[58] Field of Search .................................... 345/352, 353, 345/340, 348, 349, 354, 355, 356, 357, 336, 337, 338, 327, 328, 326, 339

[56] References Cited

U.S. PATENT DOCUMENTS

5,691,972  11/1997  Tsuga et al. ............................. 369/275

OTHER PUBLICATIONS

"Samsung DVD Players Debut in New York Area at HArvey Electronics," Business Wire, Apr. 7, 1997.
"Warner Home Video Announces First DVD Titles . . . " PR Newswire, Jan. 8, 1997.
"Major Studios Take DVD Nationawide, . . . ," Business Wire, Jul. 8, 1997.
Nilsson, Frank; "DVD–the storage medium for the future?"; Accessed Sep. 8, 1997; pp. 1–9.
DVD Frequently Asked Questions (with answers!); Accessed Jun. 18, 1997; http://www.videodiscovery.com/vdyweb/dvd/vdfaq.html.
Parker, Dana J.; "DVD: The Update"; *CD–ROM Professional*, Aug., 1996; Accessed Sep. 8, 1997; pp. 1–10.
"Digital Video Disc: The Coming Revolution in Consumer Electronics"; *C–Cube Microsystems;* Accessed Jun. 23, 1997; http://www.c–cube.com/technology/dvd.html.
"Toshiba SD3006 DVD Digital Video Disc Player"; Consumer Direct Warehouse; Accessed Jun. 18, 1997; http://www.consumer–direct.com/detail.com/detail.cfm?V-PARTNO=SD3006&WEIGHT=9.0&Q=230.0.

*Primary Examiner*—Steven Sax
*Attorney, Agent, or Firm*—Jenkens & Gilchrist, a Professional Corporation

[57] ABSTRACT

A system operable with a Digital Versatile/Video Disc source, which system includes a scheme for altering one or more user preferences without interrupting the playback of a DVD title. Whereas the DVD title may have title-specific or content-provider-specific settings, the present invention decouples the user-selected preferences from the settings and stores them in a persistent medium. A generalized graphic user interface is presented for allowing a user to read the persistent medium to determine current preference values and to change them if desired. The changed values are then written back to the persistent medium so as to be available for current or future playback sessions of the DVD title. As a variation, the generalized graphic user interface may be used for providing an indication as to what other preference values are available for that title in addition to the current value in effect.

11 Claims, 5 Drawing Sheets

SYSTEMS WITH USER PREFERENCE SETTING SCHEMES

CROSS-REFERENCE TO RELATED APPLICATIONS

This application hereby incorporates by reference the following co-assigned patent application which describes related subject matter in greater detail: "DEVICE WITH CONVERGED FUNCTIONALITY", filed Mar. 31, 1997 (Docket No. 27757-00098); inventors: Mark P. Vaughan, Thomas J. Brase, Drew S. Johnson, Kevin J. Brusky, and Brian V. Belmont.

BACKGROUND OF THE INVENTION

1. Technical Field of the Invention

The present invention relates to user preference setting schemes usable in devices with integrated multiple functional modalities, which devices can operate, for example, with a host of video sources. More particularly, the present invention is drawn to a user preference setting scheme operable with a convergence device system having a Digital Versatile/Video Disc (DVD) source.

2. Description of Related Art

Achieving convergence of various information, entertainment and communications technologies has become a much sought-after goal. A highly visible example of this trend is the attempt to integrate computer technologies (such as, for example, personal computer technologies) with consumer/home electronics technologies (such as, for example, television technologies, video game technologies, video telephony, video/laser disc technologies, et cetera). It is hoped that one of the products of this convergence will be a single integrated device for information, entertainment and communications, which device can, at least in part, utilize the available communications bandwidth, mass storage and graphics handling capabilities of the personal computer (PC) to deliver, store and display a variety of applications so as to provide a seamlessly unified audio-visual environment to consumers.

In spite of many recent advances in this area, several problems persist. One of the more significant problems is the difficulty of providing to a consumer (alternatively, a user or viewer) means for effective content control and engaging interactivity, preferably all in one machine, with the option of selectable content customization. It can be readily appreciated by those skilled in the art that the need to address and obviate this problem is especially pronounced in cases wherein currently available advanced storage technologies such as, for example, the Digital Versatile/Video Disc (DVD) technology, are integrated with a highly converged device that offers multiple modes of "functionalities." In simple terms, there are so many factors involved that providing easy, but effective, control is difficult in highly converged devices. A commonly-owned, pending U.S. patent application entitled "DEVICE WITH CONVERGED FUNCTIONALITY", filed Mar. 31, 1997 (Docket No. 27757-00098; inventors: Mark P. Vaughan, Thomas J. Brase, Drew S. Johnson, Kevin J. Brusky, and Brian V. Belmont) describes subject matter related to such a highly converged device in greater detail and is incorporated herein by reference.

Because the teachings of the present invention are exemplified in relation to various aspects of DVD technology, particularly when integrated with a convergence device, a brief description thereof is deemed appropriate and is provided immediately hereinbelow.

The DVD technology is an advanced, digital storage technology for video, audio, data, and any combination thereof, and is centered around a new medium (a laser-readable disc) capable of storing up to about 17 Gigabytes of information. As is known in the art, the copious amount of digital information is provided on the disc in accordance with a standardized format. Analogous to current consumer electronics formats, it is useful to visualize the DVD format technology as a total system that comprises a mastering facility, a physical storage/distribution medium (the disc itself) and a player. The mastering process may typically comprise several steps which include inserting various codes for controlling the presentation of video/audio information (also known as content); compressing the raw video information into a known format (for example, the Motion Picture Experts Group—2, or, MPEG-2, format) using a process called variable bit rate encoding; compressing the audio information also into a known format such as, for example, the Dolby® AC3 Surround Sound format; and combining the compressed audio and video information into a single, encoded data stream for producing a "master" and generating copies (i.e., laser-readable discs) therefrom.

Figure 1:
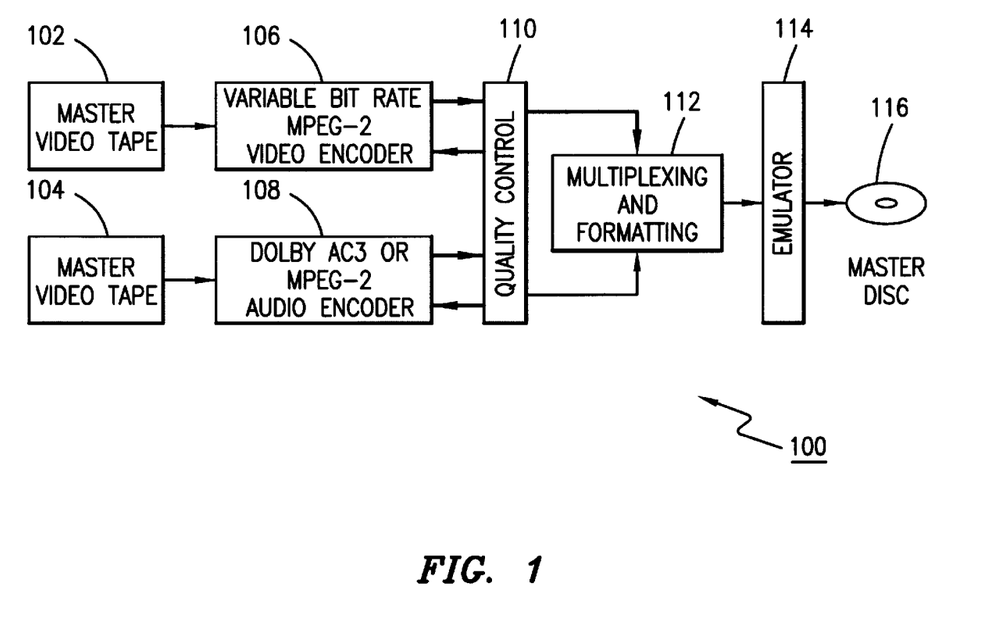
FIG. 1 illustrates a conventional DVD mastering system.

FIG. 1 depicts a block diagram of a typical DVD mastering system 100 for effectuating some of the steps described above. Inputs from a master video tape 102 and a master audio tape 104 are provided to a variable bit rate (VBR) encoder 106 and a suitable audio encoder 108, respectively. The encoders 106 and 108, in turn, are managed via content/quality control block 110 so as to provide compressed and encoded video and audio to a multiplexer/formatter 112 for generating a combined audio/video data stream. An emulator 114 is provided to simulate the playback of the data stream. A master disc 116 is then created using the "image" of the DVD data steam which may have been written to a data tape beforehand. Using replicators, a content provider may mass-produce DVD discs for market consumption by "pressing" the master 116.

The digital information on a DVD disc is organized in a well-known hierarchical file structure which allows not only a plethora of desirable features such as, for example, multiple aspect ratios, multiple language tracks and subtitles, multiple camera angles, and rudimentary forms of parental control, but also a presentation technique for allowing and facilitating user interactivity via an overlaid graphics tool, called an on-screen display (OSD) tool.

Figure 2:
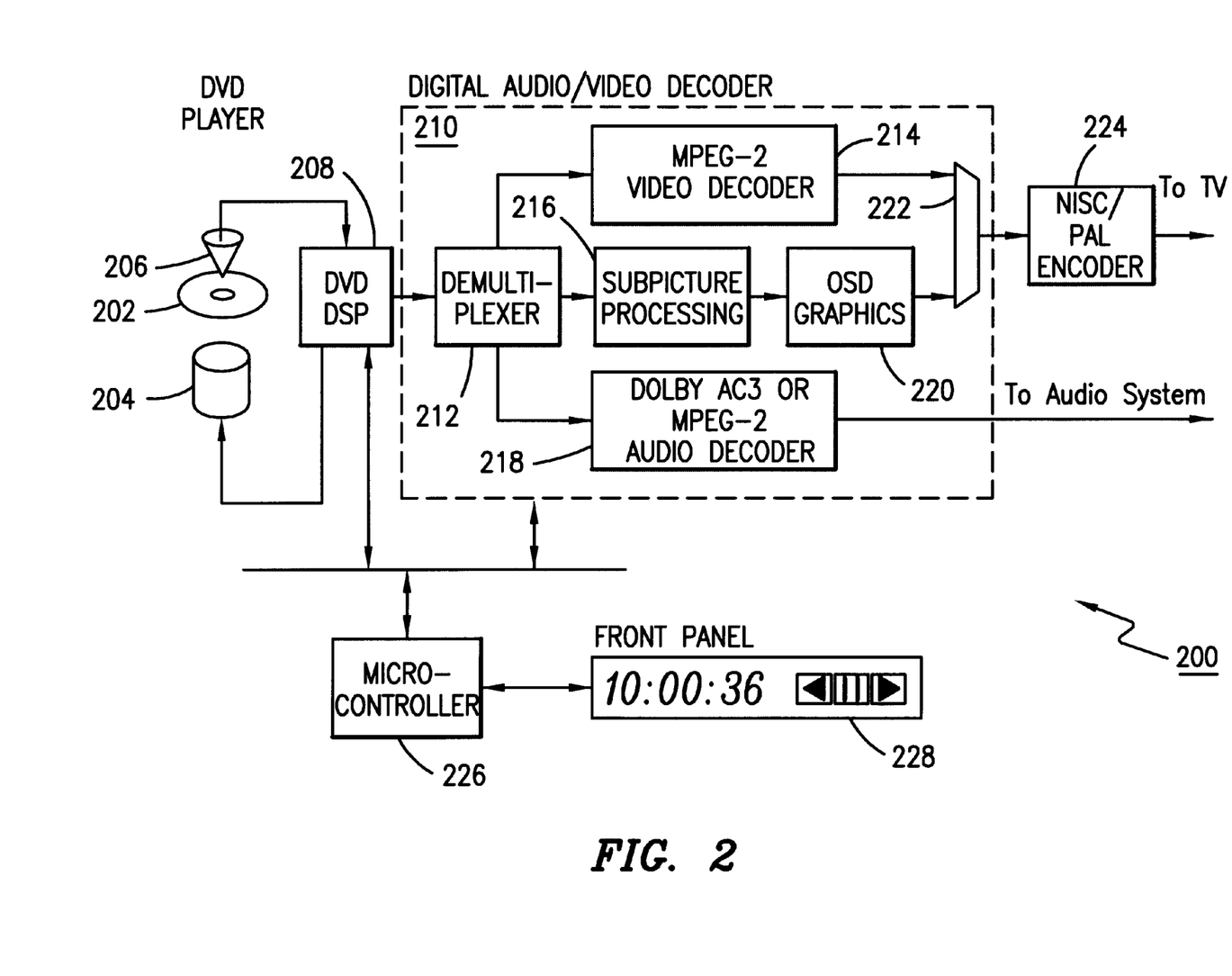
FIG. 2 depicts a block diagram of a conventional DVD player adapted for playing a DVD title.

FIG. 2 depicts the block diagram of a typical DVD player 200 for the playback of a DVD disc 202. A disc reader mechanism is provided with the player 200, which mechanism comprises a motor 204 for spinning the disc 202 and a laser 206 that reads the digital information therefrom. Typically, the laser 206 is operable in the "red" portion of the visible light spectrum. A DVD-compliant digital signal processor (DSP) 208 is provided in a feedback arrangement with the disc reader mechanism for translating the laser pulses generated from the laser 206 back into electrical form.

At the heart of the player 200 is a digital audio/video (AV) decoder 210 that receives electrical signals from the DSP 208 for further processing. The AV decoder 210 comprises several important functional blocks which act on the received electrical signals at various stages of processing. The composite signal information is initially separated by a demultiplexer 212 which provides video content stream to a video decoder 214, compressed bitmaps to a subpicture processor 216, and audio content stream to an appropriate audio decoder 218. The subpicture processor 216 provides the processed subpicture information to an OSD graphics tool 220. A video multiplexer 222 controllably presents the decoded video information from the video decoder 214 and the output from the OSD graphics tool 220 to an appropriate TV signal encoder 224 (compliant with, for example, the National Television Standards Committee (NTSC) signal format, or the Phase Alternate Line (PAL) signal format), which then provides a suitable TV signal to a TV (not shown) for playback. The decoded audio information from the audio decoder 218 may be provided to an appropriate audio system which may or may not be integrated with the TV. A microcontroller 226 is provided as part of the DVD player 200 for supervising the operation thereof. As can be readily seen, the microcontroller 226 may be engaged by the user via a remote control or front panel 228 for translating user inputs into commands for the audio/video decoder 210 and/or the disc reading mechanism of the player 200.

It can be appreciated that the DVD technology comprising the DVD discs and suitable players therefor provides significant advances over conventional media for content presentation to viewers. However, it is also known that while the DVD mastering standards have been extant for some time, the content providers who typically supply the DVD-compliant content in the form of "titles" substantially control the various available presentation settings for a particular title. It can be readily recognized that viewers who may desire to change some or all of the available settings for a particular title in order to customize the content presentation to suit their different needs and tastes may have to be provided with a mechanism for doing so in a user-friendly manner. Further, it should be apparent that the need for such mechanism is especially pronounced in a convergence device.

In addition, although DVD technology offers a wide-ranging menu of choices and options to viewers, in some instances it may be considered rather deficient. For example, it would be highly desirable to be able to view, and perhaps change, the preferences that a user has selected for a particular title during the playback thereof without interrupting it. Current implementations of DVD technology typically require that the playback of the title be stopped prior to interacting with a set-up menu provided with the OSD in order to alter the user preferences.

Moreover, it can be appreciated that it would be of further advantage if the viewer can readily ascertain the rating level of the title and what other rating levels may be available therefor during its playback. In a typical current implementation of a DVD player, no indication is provided to the viewer about what the rating level is currently in effect during the playback. Accordingly, the viewer is then forced to rely on the content provider's menus to the extent they may exist. Furthermore, where these menus are provided, they may be different for each content provider, thereby requiring the viewer to quickly interpret the variable ratings in some coherent fashion that makes an intuitive sense to the viewer, before an appropriate action is taken.

Therefore, based on the foregoing, it should be understood by those skilled in the art that there is a need for a solution that addresses these shortcomings in current implementations of DVD technology. Although several DVD systems presently exist, no current system is known to have all of the advantages and novel features of the present invention, described and claimed hereinbelow, which advantageously provides a system and method for overcoming the above-mentioned deficiencies.

SUMMARY OF THE INVENTION

In one aspect, the present invention is drawn to a system of the type including a Digital Video/Versatile Disc (DVD) source, which source is at least for playing back information contained in a DVD title, comprising: at least one DVD driver for interacting with the information provided by the DVD source; a control services system for communicating at least in part with the DVD driver, the control services system comprising an on-screen display (OSD) interface; a DVD preferences module for selecting a value associated with a parameter, wherein the parameter is related to the playback of the information; and a persistent storage medium for storing the selected value associated with the parameter, wherein the value is provided from the persistent storage medium to the control services system responsive to an input by a user via the on-screen display interface such that the value is communicable to the user without interrupting the playback of the information provided by the DVD source. In a presently preferred exemplary embodiment, the system provided in accordance with the teachings of the present invention comprises a convergence device system.

In another aspect, the teachings of the present invention disclose a method of altering user preferences without interrupting the playback of a DVD title in a convergence system, comprising the steps of: reading a current user preference value from a persistent medium, the preference value being associated with a parameter relative to the playback of the title; presenting the current user preference value to the user; providing an interface to the user for altering the current user preference value to create a new preference value; and writing the new preference value to the persistent medium.

In yet another aspect, the present invention is directed to a convergence system, comprising: means for selecting at least one parameter associated with the playback of a DVD title, the parameter having one or more selectable values; means for reading a current value relative to the parameter from a persistent medium; and means for presenting the value responsive to an input by a user during the playback of the DVD title. In some embodiments, the convergence system further comprises means for changing the current value relative to the parameter to create a new value; and means for storing the new value to the persistent medium.

BRIEF DESCRIPTION OF THE DRAWINGS

A more complete understanding of the present invention may be had by reference to the following Detailed Description when taken in conjunction with the accompanying Drawings wherein.

DETAILED DESCRIPTION OF THE DRAWINGS

Figure 3:
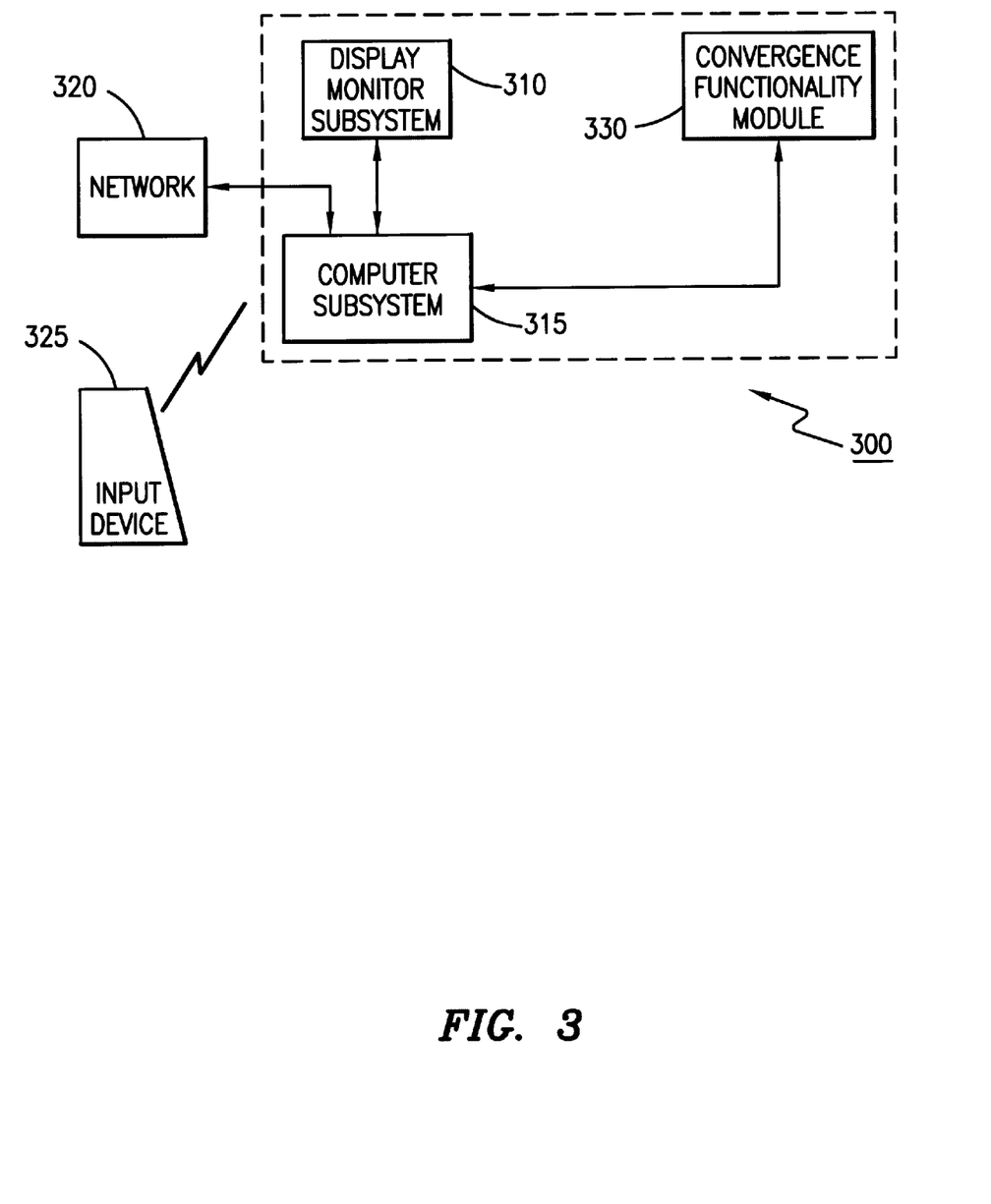
FIG. 3 depicts the block diagram of an exemplary convergence device system including a DVD source, wherein the teachings of the present invention may be utilized.

Referring now to the Drawings wherein like or similar elements are designated with identical reference numerals throughout the several views, and wherein the various elements depicted are not necessarily drawn to scale, and, in particular, to FIG. 3, there is shown a block diagram of an exemplary convergence device system (or, an electronic convergence device) 300 provided wherein the teachings of the present invention may be advantageously practiced. It should be appreciated by those skilled in the art that this block diagram is not necessarily intended to schematically represent specific modules of hardware or any particular data or control paths therebetween.

The convergence device system 300 includes a first subsystem, display monitor subsystem 310, operable to receive and display thereon display signals (or, indications thereof) received from a second subsystem, computer subsystem 315. Although not depicted, the subsystem 315 comprises a processor unit coupled to a storage unit, and may further preferably contain a communication port for enabling communication between the convergence device system 300 and a network 320.

Continuing to refer to FIG. 3, the network 320 can be understood to be any network, for example, a Local Area Network, a Metropolitan Area Network, a Wide Area Network, or the Internet. The computer subsystem 315 is connected to at least one convergence functionality module 330 that is adapted to receive and/or provide various combinations of composite and/or RF and/or video and/or audio and/or graphics and/or data signals. For example, the module 330 may comprise a receiver for receiving TV signals in any form, such as the NTSC form or the PAL form, via any medium, digital or analog, such as a cable system, a Digital Satellite System, or a network broadcast medium. In another embodiment, the module 330 may comprise a consumer/home electronics unit adapted to be integrated with the computer subsystem 315 in addition to a TV receiver. For example, a video gaming unit or a DVD unit may be provided such that the outputs (video, audio, or both) of the units are controlled or modulated by the computer subsystem 315. A video controller service in the subsystem 315 may be responsible for managing these outputs such that appropriately modulated (or decoded or processed) display signals (or, indications thereof) are selected to be forwarded to drive suitable output devices, for example, the display monitor subsystem 310 or an audio output device (not shown).

Although the module 330 and the subsystem 315 are shown to be two separate yet interconnected entities, the module 330 may in some embodiments of the present invention be integrated into the subsystem 315. Such an integrated subsystem may comprise in a single housing one or more video sources (or consumer/home electronics units including receivers for TV signals, gaming units, VCRs, video/laser disc units, video telephony units etc.), the video control service for managing and selecting among these sources and for generating appropriate display signals (or, indications thereof) to be provided to suitable output devices, and the processor and storage units.

Still continuing to refer to FIG. 3, the convergence device system 300 may be operable with an input device 325 which may comprise any of the following: remote control units, remote trackball/mouse devices, remote pointing devices, wireless or wired keyboards, keyboards integrated with pointing devices, track-balls and the like. Further, although not shown in this FIG., it should also be understood that the convergence device system 300 may contain such hardware modules as one or more power units for supplying power thereto, TV tuner boards, CD-ROM players, floppy drives, printer ports, video ports, et cetera.

Figure 4:
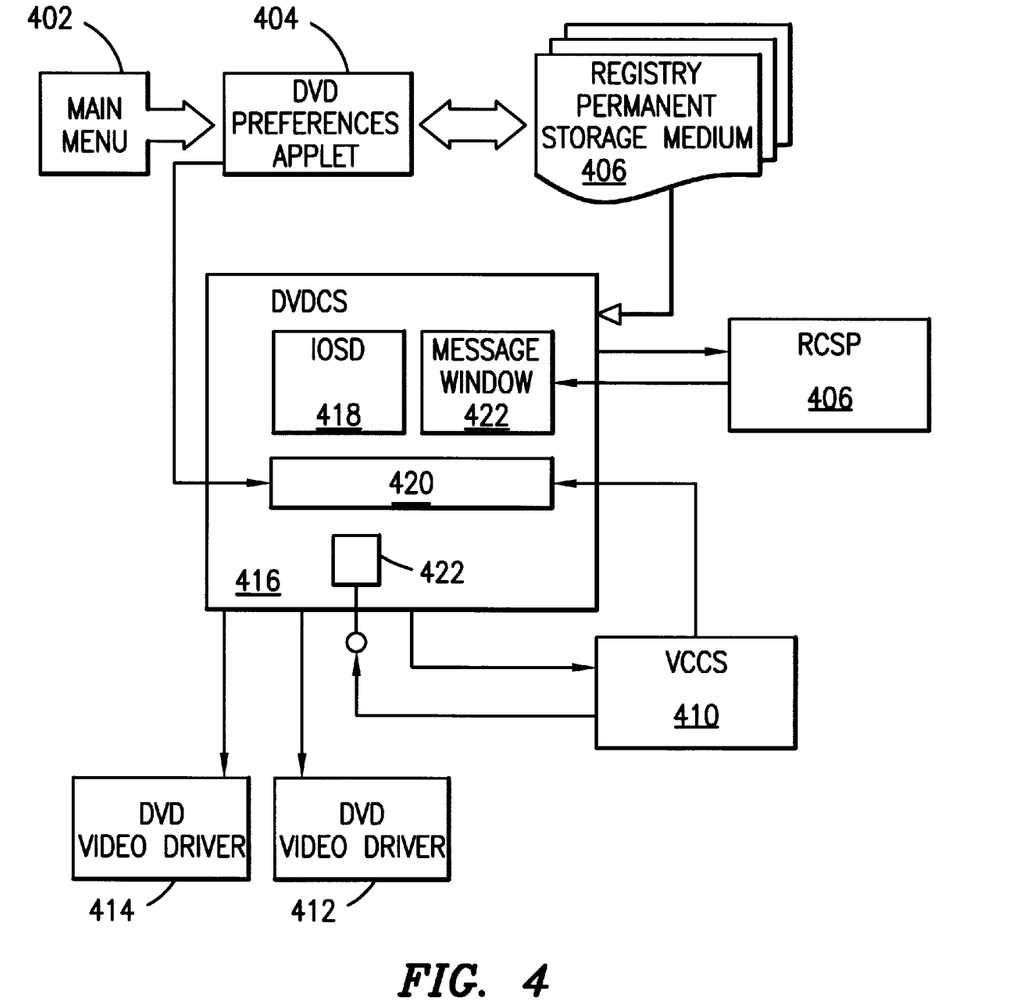
FIG. 4 depicts a functional block diagram of an exemplary embodiment of a DVD control system provided in accordance with the teachings of the present invention.

Referring now to FIG. 4, there is shown a functional block diagram of a presently preferred exemplary embodiment of a DVD control system provided in accordance with the teachings of the present invention. As will be described hereinbelow, the present invention provides an innovative mechanism for allowing the altering of user preferences without interrupting the playback of a title. Moreover, the present invention also provides a user-friendly interface for readily determining which parental level is currently in effect during the playback of a particular title and which levels are available for that title.

As mentioned in the Background, a content provider typically provides a set of various parameters that relate the playback of a title. These parameters may include, for example, alternate audio tracks, multiple languages, parental level information, et cetera. These title-specific parameter levels may be termed as "settings." These settings may be selected for a title during its playback on the fly through various on-disc menus provided by the content provider. It should be realized that these selections are merely transient, in that they would not persist from one viewing session to the next. One of ordinary skill in the art should further understand that because content providers control the playback parametric information, there is no consistent way to make these selections. Nor is there an intuitive way for a user to correlate the parametric information from one title to another or from one content provider to another, because of the variance in on-disc menus which may have the tendency to evolve based on the whims of the content provider.

On the other hand, "preferences" are those determinations or selections of the playback parameters that a user makes based on his needs. These selections are preferably stored in a persistent medium such that they may be applied to future viewing sessions of the title. Clearly, it should be appreciated that these persistent selections would not be in effect when those levels or values are not available in the first place. That is, for example, when a user selects Japanese as the preferred audio language, that user preference may not be in effect in the context of a specific title if the content provider has not supplied a Japanese program sequence in the title.

Continuing to refer to FIG. 4, a main menu 402, which is preferably provided as a "global" user interface for interacting with an integrated device having a DVD player, such as the convergence device 300 described in reference to FIG. 1, is preferably implemented to be activatable for selecting and launching a DVD preferences module (also referred to as an "applet") 404. A DVD video driver 414 and a DVD audio driver 412 are controlled by a DVD Control Services module (DVDCS) 416 which is preferably responsible for communicating therewith. In a presently preferred exemplary embodiment of the present invention, the DVDCS 416 is also responsible for monitoring system event handling and for providing an interactive OSD (IOSD) 418.

An application program interface (API) 420 associated the DVDCS 416 preferably comprises functions for affecting various picture quality parameters such as, for example, brightness, contrast, hue and saturation. In addition, the API 420 also provides a methodology for applying the user preferences set through the DVD preferences module 404. Preferably, the API 420 is implemented as an interface layer between the DVD drivers and any other component of the convergence device 300. In essence, it should be understood that the DVDCS module 416 controls the playback of a DVD title, interacts with the drivers 412, 414 to start and stop the DVD player, or, find a particular portion of a title or select a title and pass along user preferences selected by a user through the IOSD 418.

As known in the art, the screen surface associated with the display monitor of the convergence device 300 may be partitioned into a primary surface and a secondary surface (also referred to as picture-in-picture or "PIP"). In a presently preferred embodiment of the present invention, when the DVD source is the current source on the primary surface, the DVDCS 416 displays the IOSD 418. On the other hand, when the DVD source is the current source on the PIP surface, then a non-interactive OSD is displayed by the DVDCS module 416. It should be understood that these conditions are not mutually exclusive; it is possible for the DVD source to be selected on both surfaces at once. In that case, the DVDCS module 416 would display both types of OSDs.

When the DVD source is the active source in the convergence device 300, the DVDCS module 416 responds to user input from a remote control service provider module (RCSP) 408 and a video control service module (VCCS) 410. The RCSP 408 provides remote control messages to a message window 422 associated with the DVDCS module 416. The VCCS 410 preferably provides to the DVDCS module 416 through a server component known as "sink" 422 various notifications of mouse and keyboard interaction when the video window has focus. It can be appreciated by observing the control paths between the DVDCS module 416 and the VCCS 410 that these components are associated with each other in a circular server-client relationship.

Still continuing to refer to FIG. 4, a user can interact with the DVD preferences module 404 through the IOSD 418, although an appropriate control path is not explicitly shown therefor in this block diagram. The user can interact with the preferences module 404 to select the levels or values he prefers for one or more parameters affecting the playback. It is preferred that these preferences alter only the state of a persistent storage medium in the form of a system registry 406 associated with an Operating System (OS) such as, for example, Windows 95®, associated with the convergence device 300. As a variation, it may also be provided that the user can immediately apply the selected preferences to the current viewing session after first storing the appropriate values to the persistent medium or registry 406.

Accordingly, it can be appreciated that in the presently preferred exemplary embodiment of the present invention, the DVD preferences module 404 may not interact with the DVD video and audio drivers 414 and 412. Also, except for the option to immediately apply the user selections to the current playback, the preferences module 404 does not interact with the DVDCS module 416. The preferences module 404 preferably simply reads the persistent medium or registry 406, presents the current preference values to the user, allows the user to make any changes as desired and writes them back to the storage or registry 406.

Based on the foregoing, it should be realized that the present invention decouples the user setting of preferences pertaining to a particular title from the title-specific settings (typically provided by the content providers) so as to achieve the various desirable objects described hereinabove. By storing these user preferences in a persistent medium, the user can readily ascertain the preference values and parameters for a particular title without interrupting its playback during current or future viewing sessions. Because of the common, interactive user interface provided by the present invention, the difficulties and inconveniences associated with title-specific and content-provider-specific disc menus are mitigated.

As a variation, the teachings of the present invention may also be practiced for determining what a particular setting is or what the available setting levels are for a specific playback parameter such as, for example, parental level. In current implementations of the DVD technology, no indication is given to the user as to which parental management level is currently in effect, or what the available levels are for a title during its playback. Accordingly, the user is forced to rely on interacting with different title-specific menus, if any at all. In accordance with the present invention, the DVDCS module 416 in conjunction with the DVD preferences module 404 and the system registry 406 provides to the user relevant information about which parental level is currently in effect and allows the level to be changed for a particular viewing session. When one or more rating levels are present, that information may also preferably be provided through the IOSD 418, so that rather than cycling through all of the possible ratings, the user is presented with the actual available levels only.

Figure 5A:
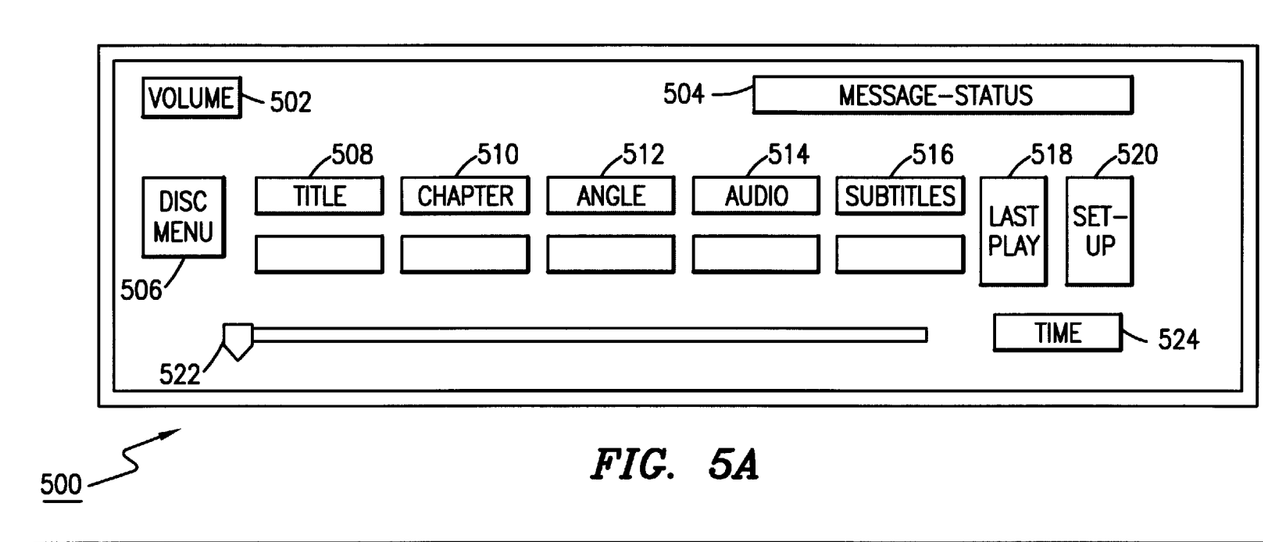
FIGS. 5A and 5B illustrate exemplary graphic user interfaces in accordance with the teachings of the present invention.
Figure 5B:
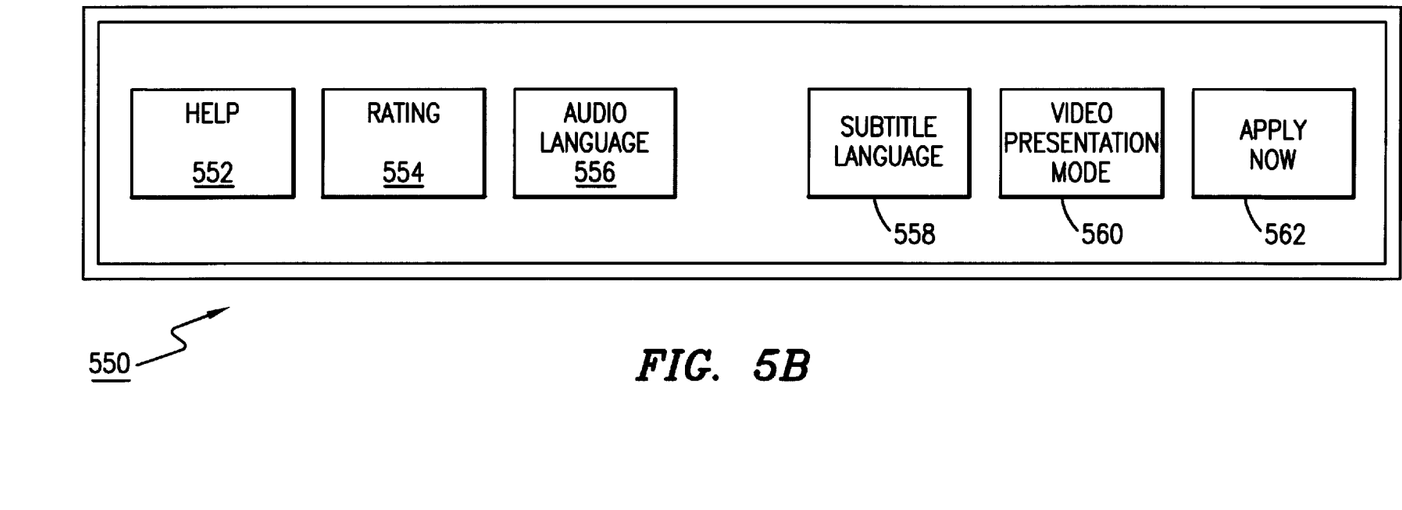

Referring now to FIGS. 5A and 5B, an exemplary embodiment of the IOSD 418 and its sub-menu options are shown. The IOSD 418 is preferably implemented as a graphic user interface (GUI) 500 which comprises both interactive and non-interactive elements. A volume label 502 displays the DVD disc volume label. A disc status message box 504 may be provided for status information regarding the state of the DVD player. The messages preferably comprise one or more of the following: play, pause, stop, open, close, loading and no disc. If necessary, current search speeds may also be displayed, for example, one-eighth speed, one-half speed, 2 times and 8 times.

Relative to the interactive components, a disc menu box 506 is implemented to preferably bring up the DVD on-disc root menu, if so desired. In this case, the GUI 500 is preferably hidden so that the user can then interact with the DVD disc menu. It may be appreciated that although a single disc menu box is shown herein, several disc menu boxes may be implemented for specific options such as, for example, a root menu option or a title menu option. Other interactive components include, for example, a title option 508, chapter option 510 and an angle option 512, each of which operates preferably sequentially. Further, audio and subtitles options 514 and 516, respectively, may also be provided for enhanced interactivity. A last play option 518 may also be preferably provided so that the user can resume the playback of a title at a later point in time from the specific position in the program sequence when the disc is ejected. A setup preferences option box 520 is provided for launching the DVD preferences module 404. Preferably, once the setup preferences box 520 is selected, the GUI 500 may be removed from display so as to avoid cluttered appearance. A chapter slider 522 and title time window 524 may also be provided for increased interactivity and user-friendliness.

Referring now specifically to FIG. 5B, an exemplary user interface 550 associated with the setup preferences option box 520 is depicted. In a presently preferred embodiment, the following components are provided: help 552, rating limit 554 for various numeric options from 1 to 9, audio language 556, subtitle language 558, video presentation mode 560 for selecting various display aspect ratios, for example, 4 by 3, 4 by 3 pan and scan, or letterbox, and apply settings now option 562 for immediately applying the selected preferences to the current title in playback. As can be appreciated, this interface 550 may be presented in various ways, for example, as a main menu with six options, each with radio-button submenus. Optionally, there may be a visual presentation of the user's selections such that the effect of the selections may be previewed in a display box.

Although only certain embodiments of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims. For example, when users select an interactive component such as, for instance, the angle option 512, that might have been locked out by the content provider in the context of a specific title, it may be provided within the scope of the present invention to transparently call into the provider's angle menu on the disc to unlock it or otherwise make use of it such that user interactivity may be further enhanced.

In addition, persistent storage or medium used for supporting any data structures associated with user preferences data in accordance herewith may include any magnetic, optical, opto-electronic, electronic or non-volatile memory components. Moreover, it should be understood by those of ordinary skill in the art upon reference hereto that the teachings contained herein may also be advantageously practiced in a computer with suitable audio/video expansion or adapter card/s and audio/video driver circuitry adapted for use with conventional DVD players. Accordingly, it is envisaged that these and other numerous modifications are within the ambit of the present invention, limited solely by the following claims.

What is claimed is:

1. A computer system of the type including a Digital Video/Versatile Disc (DVD) source, said source at least for playing back information contained in a plurality of DVD titles, said computer system comprising:
    at least one DVD driver for interacting with said information provided by said DVD source;
    a control services system for communicating at least in part with said at least one DVD driver, said control services system including an on-screen display (OSD) interface;
    a DVD preferences module for setting a user preference for playback of information from said plurality of DVD titles; and
    a non-volatile storage medium for storing said user preference, said non-volatile storage medium configured such that said stored user preference is retrievable prior to playing back information contained in one of said plurality of DVD titles;
    wherein said control services system is configured to retrieve said stored user preference from said non-volatile storage medium and wherein said information from said one of said plurality of DVD titles is played according to said retrieved user preference.

2. The system as recited in claim 1, wherein said DVD preferences module is operable via said on-screen display interface.

3. The system as recited in claim 1, wherein said non-volatile storage medium comprises a system registry the system registry including said user preference.

4. The system as recited in claim 1, wherein said user preference includes one of a preferred language setting, a preferred sub-title setting, and a preferred video presentation setting.

5. The system as recited in claim 4, wherein said OSD interface comprises an option for immediately applying said user preference to the playback of said information contained in said one of said plurality of DVD titles.

6. The system as recited in claim 1, further comprising a central processing unit connected to said DVD source, said central processing unit configured to be operable in a personal computer mode.

7. The system as recited in claim 1, further comprising: a convergence device, said DVD source included in said convergence device.

8. The system as recited in claim 1, wherein said at least one DVD driver comprises an audio driver.

9. A method of allowing a user to apply a user preference to play back of any of a plurality of DVD titles, the method comprising the steps of:
    receiving a first DVD title for play back;
    reading a current user preference from a non-volatile storage medium;
    determining if said current user preference can be applied to said first DVD title;
    responsive to the determination that said user preference can be applied to said first DVD title, automatically applying said current user preference to playback of said first DVD title.

10. The method of claim 9, further comprising the steps of:
    receiving a second DVD title for play back;
    reading said current user preference from said non-volatile storage medium;
    determining if said current user preference can be applied to said second DVD title; and
    responsive to the determination that said user preference can be applied to said second DVD title, automatically applying said current user preference to playback of said second DVD title.

11. The method of claim 10, wherein the user preference includes one of a preferred language setting, a preferred sub-title setting, and a preferred video presentation setting.

* * * * *